US010709986B2

(12) United States Patent
Maietti

(10) Patent No.: US 10,709,986 B2
(45) Date of Patent: *Jul. 14, 2020

(54) ADAPTIVE OBJECT PLACEMENT IN COMPUTER-IMPLEMENTED GAMES

(71) Applicant: Zynga Inc., San Francisco, CA (US)

(72) Inventor: Massimo Maietti, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/213,681

(22) Filed: Dec. 7, 2018

(65) Prior Publication Data

US 2019/0105571 A1 Apr. 11, 2019

Related U.S. Application Data

(63) Continuation of application No. 15/625,348, filed on Jun. 16, 2017, now Pat. No. 10,179,288.

(Continued)

(51) Int. Cl.
*A63F 13/69* (2014.01)
*A63F 13/87* (2014.01)
(Continued)

(52) U.S. Cl.
CPC ............. *A63F 13/69* (2014.09); *A63F 13/31* (2014.09); *A63F 13/58* (2014.09); *A63F 13/795* (2014.09);
(Continued)

(58) Field of Classification Search
None
See application file for complete search history.

(56) References Cited

U.S. PATENT DOCUMENTS

| 5,769,716 A | 6/1998 | Saffari et al. |
| 6,769,987 B1 | 8/2004 | Morita et al. |

(Continued)

OTHER PUBLICATIONS

"Age of Empires", Wikipedia, [Online]. Retrieved from the Internet: <URL: en.wikipedia.org/wiki/Age of_Empires>, (Accessed Jul. 24, 2015), 15 pgs.

(Continued)

*Primary Examiner* — Tramar Y Harper
(74) *Attorney, Agent, or Firm* — Schwegman Lundberg & Woessner, P.A.

(57) ABSTRACT

A system, a machine-readable storage medium storing instructions, and a computer-implemented method are described herein for an Alliance Engine. The Alliance Engine receives a selection, by a first player, of a first tile to be controlled by a first enforcer asset on behalf of the first player. The first tile provides access to a first type of in-game resource to the first player. The Alliance Engine detects the first tile is adjacent to a second tile. The second tile is controlled by a second enforcer asset on behalf of a second player. The first player and the second player belong to a player alliance. The second tile providing access to a second type of in-game resource to the second player. Based on the detected adjacency, the Alliance Engine transfers a portion of the first type of in-game resource of the first tile to the second player. The Alliance Engine transfers a portion of the second type of in-game resource of the second tile to the first player.

17 Claims, 8 Drawing Sheets

Related U.S. Application Data

(60) Provisional application No. 62/352,148, filed on Jun. 20, 2016.

(51) Int. Cl.
| | | |
|---|---|---|
| *A63F 13/847* | (2014.01) | |
| *A63F 13/58* | (2014.01) | |
| *A63F 13/795* | (2014.01) | |
| *A63F 13/31* | (2014.01) | |
| *A63F 13/32* | (2014.01) | |
| *A63F 13/327* | (2014.01) | |
| *A63F 13/332* | (2014.01) | |
| *A63F 13/33* | (2014.01) | |
| *A63F 13/335* | (2014.01) | |

(52) U.S. Cl.
CPC ............ *A63F 13/847* (2014.09); *A63F 13/87* (2014.09); *A63F 13/32* (2014.09); *A63F 13/327* (2014.09); *A63F 13/33* (2014.09); *A63F 13/332* (2014.09); *A63F 13/335* (2014.09); *A63F 2300/575* (2013.01)

(56) References Cited

U.S. PATENT DOCUMENTS

| | | | | |
|---|---|---|---|---|
| 8,328,643 | B1 * | 12/2012 | Osvald | G06Q 10/101 |
| | | | | 463/42 |
| 8,464,181 | B1 | 6/2013 | Bailiang et al. | |
| 8,485,897 | B1 * | 7/2013 | Marsland | H04L 67/38 |
| | | | | 463/31 |
| 8,932,138 | B2 * | 1/2015 | Wang | A63F 13/12 |
| | | | | 463/1 |
| 9,373,213 | B1 | 6/2016 | Archer | |
| 10,179,288 | B2 | 1/2019 | Maietti | |
| 2002/0045470 | A1 * | 4/2002 | Atsumi | A63F 13/10 |
| | | | | 463/1 |
| 2002/0196250 | A1 | 12/2002 | Anderson et al. | |
| 2003/0040350 | A1 | 2/2003 | Nakata et al. | |
| 2004/0254016 | A1 | 12/2004 | Shimazaki | |
| 2005/0043075 | A1 | 2/2005 | Lin et al. | |
| 2005/0101365 | A1 | 5/2005 | Ogita et al. | |
| 2005/0266908 | A1 | 12/2005 | Hattori et al. | |
| 2005/0277456 | A1 | 12/2005 | Mizuguchi et al. | |
| 2006/0181549 | A1 | 8/2006 | Alkouh | |
| 2007/0287517 | A1 | 12/2007 | Asuna et al. | |
| 2008/0214273 | A1 * | 9/2008 | Snoddy | G07F 17/32 |
| | | | | 463/19 |
| 2009/0113338 | A1 * | 4/2009 | Hamilton, II | G06T 19/00 |
| | | | | 715/781 |
| 2012/0289339 | A1 * | 11/2012 | Wang | A63F 13/358 |
| | | | | 463/42 |
| 2012/0302353 | A1 * | 11/2012 | Yang | H04L 67/38 |
| | | | | 463/42 |
| 2012/0315993 | A1 * | 12/2012 | Dumont | G07F 17/3225 |
| | | | | 463/42 |
| 2012/0322556 | A1 | 12/2012 | Rogers et al. | |
| 2017/0007925 | A1 | 1/2017 | Archer | |
| 2017/0340971 | A1 * | 11/2017 | Schwaiger | A63F 13/20 |
| 2017/0361232 | A1 | 12/2017 | Maietti | |

OTHER PUBLICATIONS

"U.S. Appl. No. 13/478,217 Non Final Office Action dated Jul. 7, 2014", 10 pgs.
"U.S. Appl. No. 13/478,217, Examiner Interview Summary dated Jan. 22, 2016", 3 pgs
"U.S. Appl. No. 13/478,217, Final Office Action dated Nov. 17, 2015", 16 pgs.
"U.S. Appl. No. 13/478,217, Non Final Office Action dated Mar. 30, 2015", 14 pgs.
"U.S. Appl. No. 13/478,217, Notice of Allowance dated Feb. 17, 2016", 11 pgs
"U.S. Appl. No. 13/478,217, Response filed Jan 29, 2016 to Final Office Action dated Nov. 17, 2015", 12 pgs.
"U.S. Appl. No. 13/478,217, Response filed Jul. 30, 2015 to Non-Final Office Action dated Mar. 30, 2015", 14 pgs.
"U.S. Appl. No. 13/478,217, Response filed Dec. 8, 2014 to Non Final Office Action dated Jul. 7, 2014", 13 pgs.
"U.S. Appl. No. 15/175,714, Final Office Action dated Oct. 5, 2018", 20 pgs.
"U.S. Appl. No. 15/175,714, Final Office Action dated Oct. 20, 2017", 20 pgs.
"U.S. Appl. No. 15/175,714, Non Final Office Action dated Feb. 9, 2018", 21 pgs
"U.S. Appl. No. 15/175,714, Non Final Office Action dated May 4, 2017", 17 pgs.
"U.S. Appl. No. 15/175,714, Response filed Jan. 22, 2018 to Final Office Action dated Oct. 20, 2017", 10 pgs.
"U.S. Appl. No. 15/175,714, Response filed 08-04-17 to Non Final Office Action dated May 4, 2017", 13 pgs,
"U.S. Appl. No. 15/175,714, Response filed Jun. 7, 2018 to Non Final Office Action dated Feb. 9, 2018", 14 pgs.
"U.S. Appl. No. 15/625,348, First Action Interview—Pre-Interview Communication dated Jun. 5, 2018", 11 pgs.
"U.S. Appl. No. 15/625,348, Notice of Allowance dated Aug. 31, 2018", 16 pgs.
"U.S. Appl. No. 15/175,714, Preliminary Amendment filed Sep. 27, 2016", 9 pgs.
"Screenshot of Age of Empires II", [Online]. Retrieved from the Internet: <URL: www.gamefaqs.com/pc/63605-age-of-empires-ii-the-age-of-kings/images/screen-12>, (Accessed Jul. 24, 2015), 4 pgs.
"Screenshot of Sim City 4 (2003)", [Online] Retrieved from the Internet: <URL: http://www.pcgameshardware.com/&menu=browser&mode+article&image_id=917823&article_id=662892&page=2>, (Accessed Aug. 23, 2012), 1 pg.
"Sim City", Wikipedia, [Online]. Retrieved from the Internet: <URL: en.wikipedia.org/wiki/SimCity>, (Accessed Aug. 23, 2012), 11 pgs.
"SimFarm", Wikipedia, [Online]. Retrieved from the Internet: <URL: en.wikipedia.org/wiki/SimFarm>, (Accessed Jul. 24, 2015), 2 pgs.
Nintendo, "3-D Tetris Virtual Boy Instruction Booklet", (1996), 28 pages.
Nintendo, "3D Tetris Manual", (1987), 1-28.
Nintendo, "Tetris Instruction Booklet", (1989), 9 pages.
Stranno, "3d Tetris", [Online]. Retrieved from the Internet: <https://www.youtube.com/watch?v=4Kw9mks-wd8>, (Feb. 13, 2011), 1-2.
"U.S. Appl. No. 15/625,348, PTO Response to Rule 312 Communication dated Dec. 18, 2018", 2 pgs.

* cited by examiner

ADAPTIVE OBJECT PLACEMENT IN COMPUTER-IMPLEMENTED GAMES

CROSS-REFERENCE TO RELATED APPLICATIONS

This application is a continuation of U.S. patent application Ser. No. 15/625,348, filed on Jun. 16, 2017, which claims the benefit of priority to U.S. Provisional Application Ser. No. 62/352,148, filed on Jun. 20, 2016, which applications are incorporated herein by reference in their entireties.

TECHNICAL FIELD

The subject matter disclosed herein generally relates to the technical field of special-purpose machines for provision and/or management of virtual objects in a computer-implemented gaming environment, including software-configured computerized variants of such special-purpose machines and improvements to such variants, and to the technologies by which such special-purpose machines become improved compared to other special-purpose machines.

BACKGROUND

In many games, there is a virtual world or some other imagined playing space where a player/user of the game controls one or more player characters (herein "character," "player character," or "PC"). Player characters can be considered in-game representations of the controlling player. As used herein, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, etc. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

An electronic social networking system typically operates with one or more social networking servers providing interaction between users such that a user can specify other users of the social networking system as "friends." A collection of users and the "friend" connections between users can form a social graph that can be traversed to find second, third and more remote connections between users, much like a graph of nodes connected by edges can be traversed.

Many online computer games are operated on an online social networking system. Such an online social networking system allows both users and other parties to interact with the computer games directly, whether to play the games or to retrieve game- or user-related information. Internet users may maintain one or more accounts with various service providers, including, for example, online game networking systems and online social networking systems. Online systems can typically be accessed using browser clients (e.g., Firefox, Chrome, Internet Explorer).

DETAILED DESCRIPTION

Figure 1:
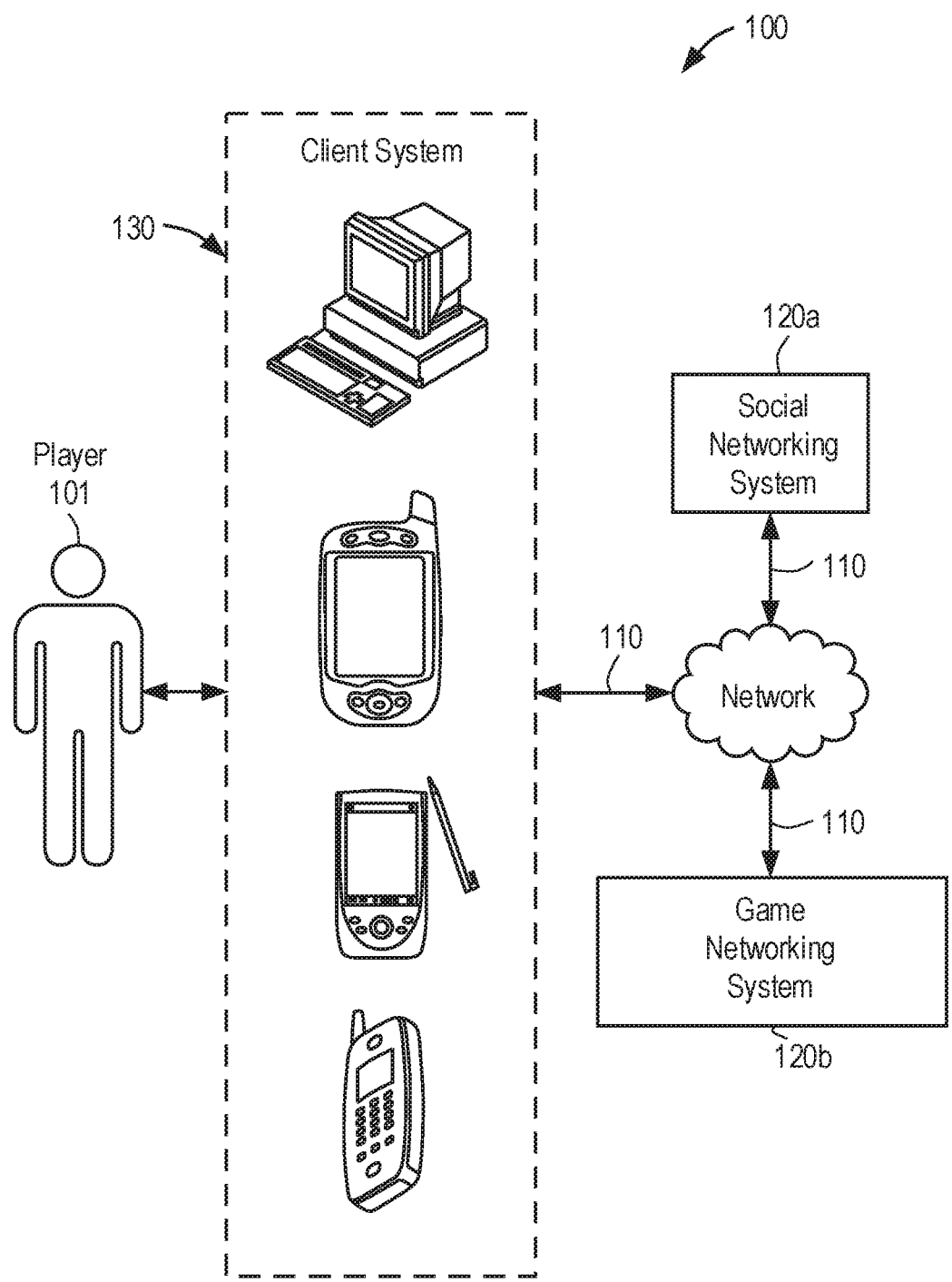
FIG. 1 is a schematic diagram showing an example of a system, according to some example embodiments.

One aspect of the disclosure provides for a system, a machine-readable storage medium storing instructions, and a computer-implemented method for a game engine, such as an Alliance Engine, configured to determine an adjacency value for a pair of in-game objects respectively controlled by a corresponding pair of players. The adjacency value indicates a distance between the pair of in-game objects within a virtual world with in which controlled gameplay occurs and within which the pair of in-game objects are located. The Alliance Engine determines whether or not the pair of in-game objects satisfies one or more adjacency effect criteria. Conditional upon satisfaction of the one or more adjacency effect criteria, the Alliance Engine dynamically varies one or more attributes of at least one of the pair of in-game objects responsive to variation in the adjacency value for the pair of in-game objects. The one or more adjacency effect criteria include a relationship condition with respect to a respective group memberships of the pair of controlling players.

A system, a machine-readable storage medium storing instructions, and a computer-implemented method are described herein for an Alliance Engine. The Alliance Engine receives a selection, by a first player, of a first tile to be controlled by a first enforcer asset on behalf of the first player. The first tile provides access to a first type of in-game resource to the first player. The Alliance Engine detects that the first tile is adjacent to a second tile, which is controlled by a second enforcer asset on behalf of a second player. The first player and the second player belong to a player alliance. The second tile providing access to a second type of in-game resource to the second player. Based on the detected adjacency, the Alliance Engine modifies one or more in-game resources. For example, the Alliance Engine transfers a portion of the first type of in-game resource of the first tile to the second player. The Alliance Engine transfers a portion of the second type of in-game resource of the second tile to the first player. It is understood that, in various embodiments, such modification of in-game resources based on detected adjacency can be increasing an in-game benefit or modifying a virtual object. In other embodiments, detection of adjacency triggers other actions not limited to resource transfers. For example, the Alliance Engine increases in-game resources of both the first and second players based on detecting adjacency between their respective tiles. In another example embodiment, the Alliance Engine modifies in-game resources of both the first and second players based on detecting adjacency between their respective tiles—such that there is a lossless benefit to the first and second players.

In this context, a group of players is a subset of players formally linked together for cooperative gameplay. In some embodiments, player groups are provided by alliances or guilds. In some embodiments, the relationship condition requires membership by the pair of players of a common player group.

In some embodiments, the one or more attributes that are dynamically variable conditional upon satisfaction of the adjacency effect criteria comprise a visual attribute of one or more of the pair of in-game objects. For example, a shape, colour, size, and/or intensity of at least one of the pair of in-game objects may change automatically responsive to the pair of in-game objects being brought within a predefined threshold distance from one another.

Instead, or in addition, the one or more variable attributes may in some embodiments include a functionality and/or effect of one or more of the pair of in-game objects. For example, a particular type of in-game object may have a latent functionality that is activated only when located within a predefined threshold distance from a certain type of in-game object controlled by a player who is a guild member of a guild of which the controlling player of the in-game object is also a member. In one example embodiment, an asset transfer functionality that provides for the capacity to transfer assets between guild members via a particular type of in-game object is available only when one of that type of objects is located within a threshold distance from an associated guild member object. In some embodiments, the threshold distance is location of the relevant pair of in-game objects on neighboring game tiles. As such, a current state of adjacency is a lowest measure of a threshold distance between game tiles. It is understood that different measures of threshold distances between tiles trigger different corresponding modifications to adaptive properties. In some embodiments, for example, tiles are adjacent to each other when they are in contact with each other. In some embodiments, for example, tiles are adjacent to each other when they are within a pre-defined distance range from each other.

Instead, or in addition, the one or more variable attributes may in some embodiments include a quantum, size, and/or strength of a particular functionality or effect of one or both of the pair of in-game objects. For example, a resource generation amplification effect exerted by one of the pair of in-game objects on the other may increase with a decrease in distance between the objects. In some embodiments, a benefit generation rate, resource production rate, or harvest rate of a particular object may be dynamically variable dependent on relative position to in-game objects of a specific type controlled by alliance members.

In some example embodiments, the game engine comprises an Alliance Engine that receives a first selection to join a player alliance from a first player, who has territorial control of a first headquarters tile of a territory grid of an online game. The Alliance Engine receives a second selection to join the player alliance from a second player, who has territorial control of a second headquarters tile of the territory grid. The Alliance Engine grants a first enforcer asset to the first player and a second enforcer asset to the second player. The Alliance Engine receives a selection by the first player of a first tile to be controlled by the first enforcer asset on behalf of the first player, the first tile providing access to a first type of in-game resource. The Alliance Engine receives a selection by the second player of a second tile to be controlled by the second enforcer asset on behalf of the second player, the second tile providing access to a second type of in-game resource.

The Alliance Engine detects that the first tile satisfies the adjacency criteria with respect to the second tile (e.g., being immediately adjacent to each other, or, in another embodiment, being within a threshold number of tiles or tile-hops from each other) while the first player and the second player are members of the alliance. Based on the detected adjacency, the Alliance Engine in some embodiments provides a selectable option to the first player to transfer a portion of the first type of in-game resource of the first tile to the second player. The Alliance Engine also provides a selectable option to the second player to transfer a portion of the second type of in-game resource of the second tile to the first player. In an alternative embodiment, no selectable option is required and in-game resources are automatically shared by all players based on membership in a player alliance and the portions shared are based on a ratio that is determined by the Alliance Engine. The ratio can be modified by parameters such as alliance level or other such global modifiers. The Alliance Engine updates an adaptive visual display property for both the first tile and the second tile based at least on the detected adjacency. The Alliance Engine updates an adaptive resource property of the first tile based in part on a current strength level of the first enforcer asset. The updated adaptive resource property increases an amount of the first type of in-game resource available to the first player from the first tile via the first enforcer asset.

Although the above example embodiments are described herein as being implemented via a web browser on a client device, it is to be noted that a game display may in some embodiments be provided by a virtual reality (VR) display or an augmented reality (AR) display. AR comprises a live direct or indirect view of a physical, real-world environment whose elements are augmented (or supplemented) by computer-generated sensory input such as sound, video, graphics or GPS data. It is related to a more general concept called mediated reality, in which a view of reality is modified (possibly even diminished rather than augmented) by a computer. As a result, the technology functions by enhancing one's current perception of reality. An augmented reality gaming device may allow players to interact with visual elements thus overlaid on the view of reality. Augmentation may be performed in real-time and may comprise overlaying on the view of reality one or more user interface elements that can be selected a manipulated by the user, and may further comprise overlaying on the view of reality game objects and/or character with which the player can interact during gameplay.

Virtual Reality (VR), which can be referred to as immersive multimedia or computer-simulated life, replicates an environment that simulates physical presence in places in the real world or imagined worlds and lets the user interact in that world. Virtual reality artificially creates sensory experiences, which can include sight, hearing, touch, smell, taste, and more. Virtual reality environments can be displayed either on a computer screen or with special stereoscopic displays, and some simulations include additional sensory information and focus on real sound through speakers or headphones targeted towards VR users. Some advanced, haptic, systems now include tactile information, generally known as force feedback in medical, gaming and military applications. Furthermore, virtual reality covers remote communication environments which provide virtual presence of users with the concepts of telepresence and telexistence or a virtual artifact (VA) either through the use of standard input devices such as a keyboard and mouse, or through multimodal devices such as a wired glove or omnidirectional treadmills. The simulated gaming environment displayed to the user by use of a virtual reality gaming device can for some games be similar to the real world in order to create a lifelike experience, while the virtual gaming environment seemingly inhabited by the player during VR gameplay may in other embodiments be stylized environments that differ significantly from reality It is understood that various embodiments described herein further include encoded instructions that comprise operations to generate a user interface(s) and various user interface elements related to the online game and a virtual online gaming environment. The user interface and the various user interface elements can be representative of any of the operations, data, game actions, adaptive properties, players, enforcer assets, alliances, updated adaptive properties, tiles, types of resources, in-game points, in-game health and various types of virtual objects, as described herein. In addition, the user interface and various user interface elements are caused for display by the Alliance Engine on a computing device, a server computing device, a mobile computing device, etc.

Social Network Systems and Game Networking Systems

FIG. 1 illustrates an example of a system for implementing various disclosed embodiments. In particular embodiments, system 100 comprises player 101, social networking system 120a, game networking system 120b (i.e. online gaming system), client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120a (i.e. social network system) is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social networking system 120a and game networking system 120b. Client system 130 can access social networking system 120a or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, etc.

Although FIG. 1 illustrates a particular number of players 101, social network systems 120a, game networking systems 120b, client systems 130, and networks 160, this disclosure contemplates any suitable number of players 101, social network systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social networking system 120a, game networking system 120b, client system 130, and network 160, this disclosure contemplates any suitable arrangement of player 101, social networking system 120a, game networking system 120b, client system 130, and network 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120a, game networking system 120b, client system 130, and network 160, this disclosure contemplates any suitable connections between player 101, social networking system 120a, game networking system 120b, client system 130, and network 160. As an example and not by way of limitation, in particular embodiments, client system 130 may have a direct connection to social networking system 120a or game networking system 120b, bypassing network 160.

Online Games and Game Systems

Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120b (i.e. online gaming system), which includes a Notification Generator 150 that performs operations according to embodiments as described herein. The game networking system 120b can be accessed using any suitable connection with a suitable client system 130. A player may have a game account on game networking system 120b, wherein the game account can contain a variety of information associated with the player (e.g., the player's personal information, financial information, purchase history, player character state, game state). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player 101 of an online game hosted on game networking system 120b. Game networking system 120b can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmitting user inputs or other events to the game engine, and receive instructions from the game engine. The game engine can be executed on any suitable system (such as, for example, client system 130, social networking system 120a, or game networking system 120b). As an example and not by way of limitation, client system 130 can download client components of an online game, which are executed locally, while a remote game server, such as game networking system 120b, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (such as, for example, by typing on the keyboard or clicking the mouse of client system 130), the client components of the game may transmit the player's input to game networking system 120b.

Storing Game-Related Data

A database may store any data relating to game play within a game networking system 120b. The database may include database tables for storing a player game state that may include information about the player's virtual gameboard, the player's character, or other game-related information. For example, player game state may include virtual objects owned or used by the player, placement positions for virtual structural objects in the player's virtual gameboard, and the like. Player game state may also include in-game obstacles of tasks for the player (e.g., new obstacles, current obstacles, completed obstacles, etc.), the player's character attributes (e.g., character health, character energy, amount of coins, amount of cash or virtual currency, etc.), and the like.

The database may also include database tables for storing a player profile that may include user-provided player information that is gathered from the player, the player's client device, or an affiliate social network. The user-provided player information may include the player's demographic information, the player's location information (e.g., a historical record of the player's location during game play as determined via a GPS-enabled device or the internet protocol (IP) address for the player's client device), the player's localization information (e.g., a list of languages chosen by the player), the types of games played by the player, and the like.

In some example embodiments, the player profile may also include derived player information that may be determined from other information stored in the database. The derived player information may include information that indicates the player's level of engagement with the virtual game, the player's friend preferences, the player's reputation, the player's pattern of game-play, and the like. For example, the game networking system 120b may determine the player's friend preferences based on player attributes that the player's first-degree friends have in common, and may store these player attributes as friend preferences in the player profile. Furthermore, the game networking system 120b may determine reputation-related information for the player based on user-generated content (UGC) from the player or the player's $N^{th}$ degree friends (e.g., in-game messages or social network messages), and may store this reputation-related information in the player profile. The derived player information may also include information that indicates the player's character temperament during game play, anthropological measures for the player (e.g., tendency to like violent games), and the like.

In some example embodiments, the player's level of engagement may be indicated from the player's performance within the virtual game. For example, the player's level of engagement may be determined based on one or more of the following: a play frequency for the virtual game or for a collection of virtual games; an interaction frequency with other players of the virtual game; a response time for responding to in-game actions from other players of the virtual game; and the like.

In some example embodiments, the player's level of engagement may include a likelihood value indicating a likelihood that the player may perform a desired action. For example, the player's level of engagement may indicate a likelihood that the player may choose a particular environment, or may complete a new challenge within a determinable period of time from when it is first presented to him.

In some example embodiments, the player's level of engagement may include a likelihood that the player may be a leading player of the virtual game (a likelihood to lead). The game networking system 120b may determine the player's likelihood to lead value based on information from other players that interact with this player. For example, the game networking system 120b may determine the player's likelihood to lead value by measuring the other players' satisfaction in the virtual game, measuring their satisfaction from their interaction with the player, measuring the game-play frequency for the other players in relation to their interaction frequency with the player (e.g., the ability for the player to retain others), and/or the like.

The game networking system 120b may also determine the player's likelihood to lead value based on information about the player's interactions with others and the outcome of these interactions. For example, the game networking system 120b may determine the player's likelihood to lead value by measuring the player's amount of interaction with other players (e.g., as measured by a number of challenges that the player cooperates with others, and/or an elapsed time duration related thereto), the player's amount of communication with other players, the tone of the communication sent or received by the player, and/or the like. Moreover, the game networking system 120b may determine the player's likelihood to lead value based on determining a likelihood for the other players to perform a certain action in response to interacting or communicating with the player and/or the player's virtual environment.

Game Systems, Social Networks, and Social Graphs:

In an online multiplayer game, players may control player characters (PCs), a game engine controls non-player characters (NPCs) and game features, and the game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), etc. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, player 101 may access particular game instances of an online game. A game instance is copy of a specific game play area that is created during runtime. In particular embodiments, a game instance is a discrete game play area where one or more players 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more players 101 and one or more in-game objects controlled by the game engine. When accessing an online game, the game engine may allow player 101 to select a particular game instance to play from a plurality of game instances. Alternatively, the game engine may automatically select the game instance that player 101 will access. In particular embodiments, an online game comprises only one game instance that all players 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within $N_{max}$ degrees of the player, where $N_{max}$ is the maximum degree of separation allowed by the system managing the social graph (such as, for example, social networking system 120a or game networking system 120b). In one embodiment, $N_{max}$ equals 1, such that the player's social network includes only first-degree friends. In another embodiment, $N_{max}$ is unlimited and the player's social network is coextensive with the social graph.

In particular embodiments, the social graph is managed by game networking system 120b, which is managed by the game operator. In other embodiments, the social graph is part of a social networking system 120a managed by a third-party (e.g., Facebook, Friendster, Myspace). In yet other embodiments, player 101 has a social network on both game networking system 120b and social networking system 120a, wherein player 101 can have a social network on the game networking system 120b that is a subset, superset, or independent of the player's social network on social networking system 120a. In such combined systems, game network system 120b can maintain social graph information with edge type attributes that indicate whether a given friend is an "in-game friend," an "out-of-game friend," or both. The various embodiments disclosed herein are operable when the social graph is managed by social networking system 120a, game networking system 120b, or both.

Figure 2:
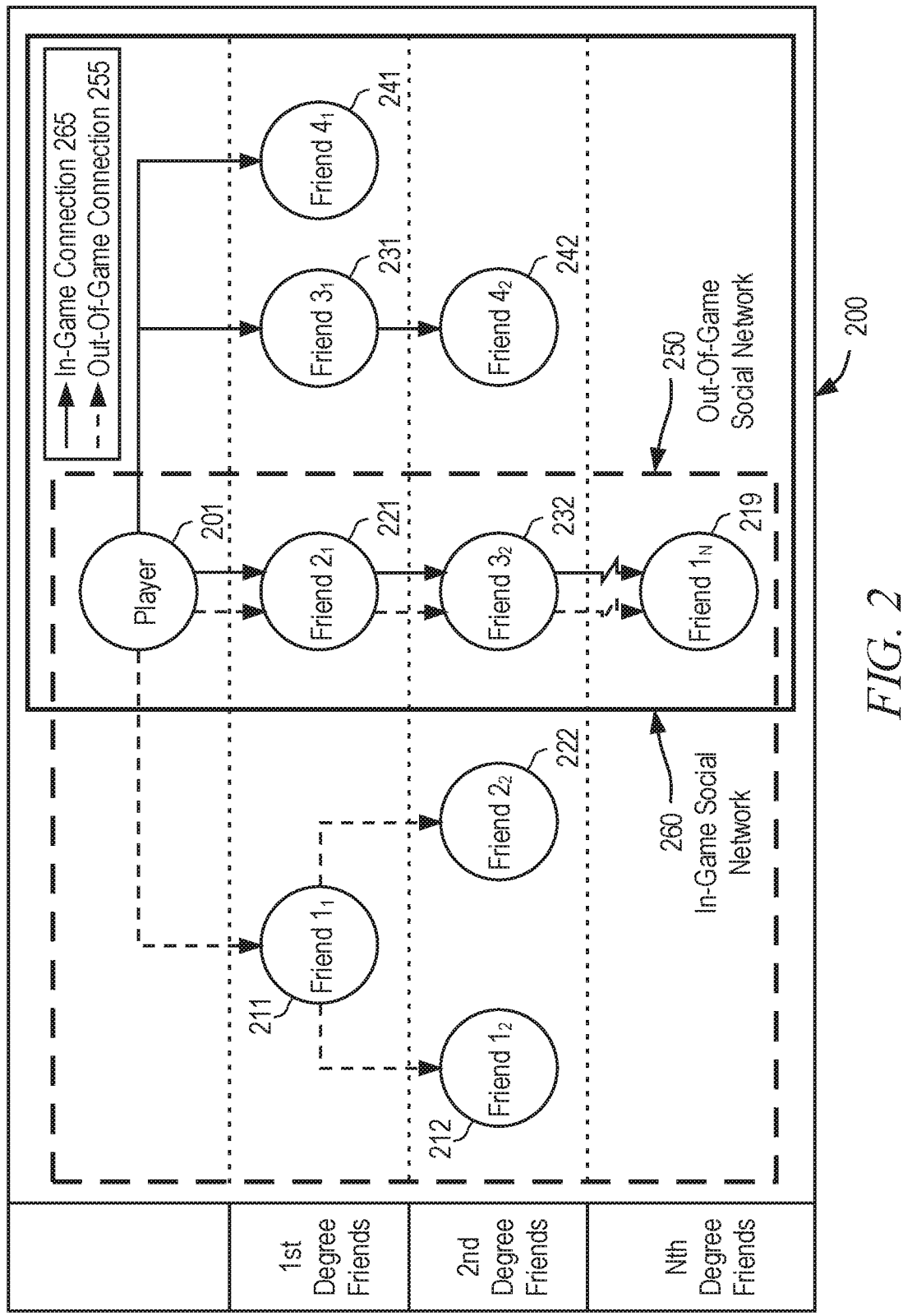
FIG. 2 is a schematic diagram showing an example of a social network within a social graph, according to some embodiments.

FIG. 2 shows an example of a social network within a social graph. As shown, Player 201 can be associated, connected or linked to various other users, or "friends," within the social network 250. These associations, connections or links can track relationships between users within the social network 250 and are commonly referred to as online "friends" or "friendships" between users. Each friend or friendship in a particular user's social network within a social graph is commonly referred to as a "node." For purposes of illustration and not by way of limitation, the details of social network 250 will be described in relation to Player 201. As used herein, the terms "player," "user," and "account" can be used interchangeably and can refer to any user or character in an online game networking system or social networking system. As used herein, the term "friend" can mean any node within a player's social network.

As shown in FIG. 2, Player 201 has direct connections with several friends. When Player 201 has a direct connection with another individual, that connection is referred to as a first-degree friend. In social network 250, Player 201 has two first-degree friends. That is, Player 201 is directly connected to Friend $1_1$ 211 and Friend $2_1$ 221. In a social graph, it is possible for individuals to be connected to other individuals through their first-degree friends (i.e., friends of friends). As described above, each edge required to connect a player to another user is considered the degree of separation. For example, FIG. 2 shows that Player 201 has three second-degree friends to which he is connected via his connection to his first-degree friends. Second-degree Friend $1_2$ 212 and Friend $2_2$ 222 are connected to Player 201 via his first-degree Friend $1_1$ 211. The limit on the depth of friend connections, or the number of degrees of separation for associations, that Player 201 is allowed is typically dictated by the restrictions and policies implemented by social networking system 120a.

In various embodiments, Player 201 can have Nth-degree friends connected to him through a chain of intermediary degree friends as indicated in FIG. 2. For example, Nth-degree Friend $1_N$ 219 is connected to Player 201 via second-degree Friend $3_2$ 232 and one or more other higher-degree friends. Various embodiments may take advantage of and utilize the distinction between the various degrees of friendship relative to Player 201.

In particular embodiments, a player (or player character) can have a social graph within an online multiplayer game that is maintained by the game engine and another social graph maintained by a separate social networking system. FIG. 2 depicts an example of in-game social network 260 and out-of-game social network 250. In this example, Player 201 has out-of-game connections 255 to a plurality of friends, forming out-of-game social network 250. Here, Friend $1_1$ 211 and Friend $2_1$ 221 are first-degree friends with Player 201 in his out-of-game social network 250. Player 201 also has in-game connections 265 to a plurality of players, forming in-game social network 260. Here, Friend $2_1$ 221, Friend $3_1$ 231, and Friend $4_1$ 241 are first-degree friends with Player 201 in his in-game social network 260. In some embodiments, it is possible for a friend to be in both the out-of-game social network 250 and the in-game social network 260. Here, Friend $2_1$ 221 has both an out-of-game connection 255 and an in-game connection 265 with Player 201, such that Friend $2_1$ 221 is in both Player 201's in-game social network 260 and Player 201's out-of-game social network 250.

As with other social networks, Player 201 can have second-degree and higher-degree friends in both his in-game and out of game social networks. In some embodiments, it is possible for Player 201 to have a friend connected to him both in his in-game and out-of-game social networks, wherein the friend is at different degrees of separation in each network. For example, if Friend $2_2$ 222 had a direct in-game connection with Player 201, Friend $2_2$ 222 would be a second-degree friend in Player 201's out-of-game social network, but a first-degree friend in Player 201's in-game social network. In particular embodiments, a game engine can access in-game social network 260, out-of-game social network 250, or both.

In particular embodiments, the connections in a player's in-game social network can be formed both explicitly (e.g., users must "friend" each other) and implicitly (e.g., system observes user behaviors and "friends" users to each other). Unless otherwise indicated, reference to a friend connection between two or more players can be interpreted to cover both explicit and implicit connections, using one or more social graphs and other factors to infer friend connections. The friend connections can be unidirectional or bidirectional. It is also not a limitation of this description that two players who are deemed "friends" for the purposes of this disclosure are not friends in real life (i.e., in disintermediated interactions or the like), but that could be the case.

Alliance Engine and Adaptive Properties

Figure 3:
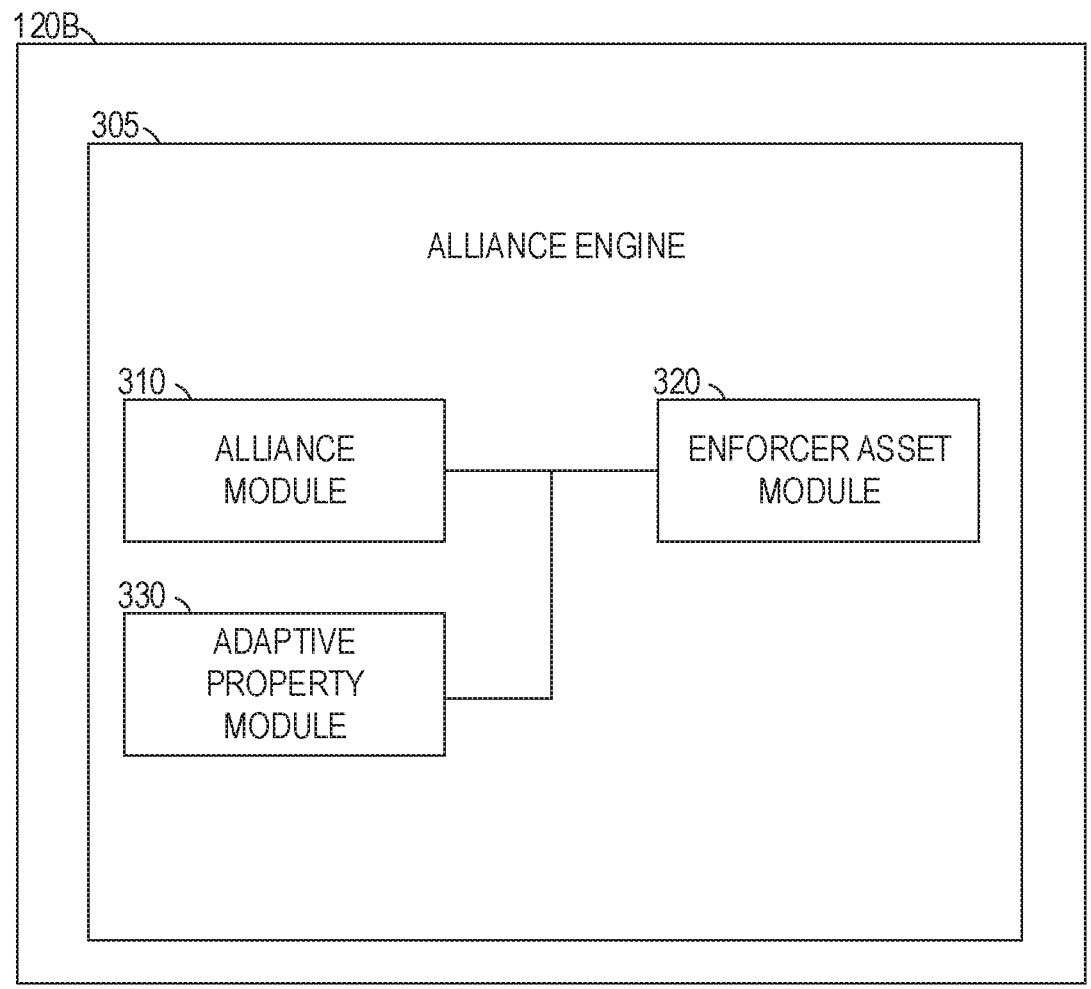
FIG. 3 is a block diagram illustrating components of a computing device, according to some example embodiments.

FIG. 3 is a block diagram illustrating components of a game networking system, according to some example embodiments. The game networking system 120b includes Alliance Engine 305. The Alliance Engine 305 includes an Alliance Module 310, an Enforcer Asset Module 320 and an Adaptive Property Module 330.

In various example embodiments, the Alliance Module 310 is a hardware-implemented module that controls, manages and stores information related to game actions from players who are each members of an alliance, as described herein.

In various example embodiments, the Enforcer Asset Module 320 is a hardware-implemented module that controls, manages and stores information related to game activity and game data for one or more enforcer assets, as described herein.

In various example embodiments, the Adaptive Property Module 330 is a hardware-implemented module that controls, manages and stores information related to updating adaptive properties of one or more tiles, as described herein.

The modules 310-330 are configured to communicate with each other (e.g., via a bus, shared memory, or a switch). Any one or more of the modules 310-330 described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

According to various exemplary embodiments, an Alliance Engine 305 generates an online game for a virtual online gaming environment that is accessed by a plurality of players. The Alliance Engine 305 causes display of a user interface of the online game on a client device associated with each of the plurality of players. In an alternative, the Alliance Engine 305 interacts and communicates with one or more modules that generate the online game. The online game includes a territory grid composed of a plurality of territory tiles. There are various types of territory tiles, where territorial control of a first type of tile provides access to a first type of in-game resource and territorial control of a second type of tile provides access to a second type of in-game resource. As such, a certain type of tile may be more desirable and beneficial to a particular player than other types of tiles. Each tile has one or more adaptive properties, such as an adaptive visual display property and an adaptive resource property. Each player in the online game is granted control over a unique territory tile, which thereby becomes a headquarters tile for a respective player.

The Alliance Engine 305 receives a selection from a subgroup of players to enter an alliance. For example, an alliance is a team of players that join together voluntarily. Each player in the alliance can maintain membership in the alliance for any duration of time and can select to terminate membership in the alliance at any time in the online game. The Alliance Engine 305 grants to each player in the alliance an enforcer asset. Each player in the alliance can further earn additional enforcer assets based on game play of the player or game play of one or more other players in the alliance.

An enforcer asset of a player occupies a tile different than the player's headquarters tile in the territory grid. For example, a first player in the alliance selects placement of a first enforcer asset on a first tile. The first player thereby has temporary territorial control over the first tile via the first enforcer asset. In addition, the first player may also have temporary territorial control over the headquarters' tile based on proximity to the first enforcer asset and strength level of the first enforcer asset. If the first tile is currently controlled by a particular player that is not a member of the alliance, the first player can select an option for the first enforcer asset to attack and to defeat the particular player in order to acquire temporary territorial control of the first tile.

While the first tile is occupied by the first enforcer asset, the first player receives in-game benefits based on a strength level of the first enforcer asset and the tile type of the first tile. For example, if the first tile represents a portion of a commercial district of a virtual city, the first enforcer asset transfers to the first player a certain percentage of virtual profits earned by simulated businesses in the portion of the commercial district. In some embodiments, such transfer of profits is allowed by the Alliance Engine 305 based on the first enforcer asset reaching and maintaining a threshold strength level. According to another embodiment, if the first tile represents a portion of a virtual farming land, the first enforcer asset transfers to the first player a certain amount of crops harvested in the portion of the virtual farming land. In some embodiments, virtual profits or crops transferred to the first player are converted by the Alliance Engine 305 to in-game points, in-game health, in-game resources or various types of virtual objects. It is understood that the first tile upon which the first enforcer asset is situated can be any available tile or currently occupied tile in the territory grid and need not be a tile adjacent to the first player's headquarters tile. Territorial control over the first tile is described herein as temporary because the first player or other players in the alliance must select and perform subsequent game actions to maintain control over the first tile. As such, the first player's territorial control of the first tile can be terminated or lost.

The first player can increase a strength level of the first enforcer asset. For example, the Alliance Engine 305 receives game actions selected by the first player (or by other players in the alliance) that increases the first player's levels of in-game points, in-game health, in-game resources and various types of virtual objects. The Alliance Engine 305 provides the first player with a selectable option to transfer any of the acquired in-game points, in-game health, in-game resources and various types of virtual objects to the first enforcer asset in order to increase a strength level of the first enforcer asset. For example, based on the first player satisfying a certain level of in-game points, the first player can transfer a certain amount of the in-game points to the first enforcer asset. Based on the first player satisfying a certain level of in-game health, the first player can transfer a certain amount of the in-game health to the first enforcer asset.

Based on satisfying a threshold strength level, the first enforcer asset acquires temporary territorial control of additional tiles (a second tile, a third tile) adjacent to the first tile. If another player that is not a member of the alliance occupies the second tile, the first player transfers in-game points, in-game health, in-game resources and various types of virtual objects to the first enforcer asset such that the strength level of the first enforcer asset is sufficient enough to attack and defeat the other player currently occupying the second tile. For example, the first player transfers a certain amount of army soldiers to the first enforcer asset for use in acquiring the territorial control of the second tile. While a member of the alliance, each player can further earn additional enforcer assets based on game play (and game play of other players in the alliance) in a particular game level and based on accumulation of various types of virtual objects, in-game points, in-game health and in-game resources. Therefore, the first player can have a plurality of enforcer assets, where each enforcer asset is controlling one or more tiles of varying tile types in the territory grid. By utilizing multiple enforcer assets, the first player continually receives the in-game benefits of all the types of tiles currently controlled by his multiple enforcer assets.

In an exemplary embodiment, the Alliance Engine 305 transfers various types of virtual objects, in-game points, in-game health and in-game resources between the first player and a second player in the alliance based on their respective enforcer assets having territorial control over adjacent tiles. For example, the first enforcer asset of the first player has territorial control over the second tile and a second enforcer asset of the second player has territorial control over a fourth tile. The Alliance Engine 305 detects the second tile and the fourth tile are adjacent tiles in the territory grid.

Based on the adjacency of the second and fourth tiles, the Alliance Engine 305 provides the first and second players with a selectable option to transfer various types of virtual objects, in-game points, in-game health and in-game resources to each other—and to each other's various enforcer assets. For example, if the second tile is a type of tile that provides a water resource and the fourth tile is a type of tile that provides a currency resource, the first and second players can transfer a certain pre-defined percentage (5%, 10%, etc.) of the water resource and the currency resource between each other—or to any of each others' enforcer assets.

In various exemplary embodiments, each tile in the territory grid is an adaptive tile object which may have one or more of its properties, behaviors, or appearance automatically updated by the Alliance Engine 305 based in part on alliance membership. According to one embodiment, if a first player and a second player are members of an alliance, the Alliance Engine 305 similarly updates the properties, behaviors or appearance of each tile under control of their respective enforcer assets. For example, the Alliance Engine 305 updates the tiles to have a similar visual display property that represents the respective tiles are included in the same alliance. In some examples, adaptations may include time-sensitive adaptations of a tile that is the most recently acquired tile by an enforcer asset of a player, while in other examples, tiles may be adapted on the basis of being adjacent to each other and controlled by respective enforcer assets of players in the same alliance. In some examples, the adaptations are immediate upon an enforcer asset acquiring territorial control, and in other examples, the adaptations may be delayed until a pre-defined amount of time has lapsed. According to one embodiment, a tile under territorial control of a first player's enforcer asset may be adapted display property based on the tile providing access to an in-game resource that is particularly desirable to a second player in the alliance. By adapting the display property of the tile, the second player is visually alerted as to the tiles desirability and the second player can decide embark on a game strategy to have an enforcer asset gain territorial control over another tile that is adjacent to the tile. Once control over the adjacent tile is established, the first and second player can transfer resources between each other—or to their respective enforcer assets.

In another embodiment, the Alliance Engine 305 updates a particular tile to have temporary display property (such as a graphical flash visual effect) when an enforcer asset for a first player defeats an enforcer asset of a second player in order to commence territorial control of the particular tile. In another embodiment, the Alliance Engine 305 updates a particular tile to have temporary display property (such as a graphical alert visual effect) when an enforcer asset for a first player is close to being defeated by an enforcer asset of a second player, thereby territorial control of the particular tile will soon be acquired by the enforcer asset of the second player. Such a graphical alert visual effect may be visible only to members of an alliance of which the first player is also a member. A tile may also have an adaptive resource property updated by the Alliance Engine 305 based in part of a strength level of an enforcer asset. For example, if the Alliance Engine 305 detects that an enforcer asset currently controlling a tile has a strength level that meets a pre-defined strength level criteria, the Alliance Engine 305 update the tile's adaptive resource property that provides easier access (or quicker access or less-costly access) to the type of resource provided by the tile.

In various embodiments, it is understood that the territory grid is divided into a plurality of sub-section shapes or areas which are called "tiles" herein. For example, the territory grid can be divided into a series of squares where each square may be described uniquely by a row and a column number. While in some embodiments, the tiles may be square shaped, in other embodiments, the tiles may be any shape used to divide the map into sub sections. Other example tile shapes include diamonds, hexagons, and the like. Some or all tile boundaries may or may not be visible to a player. These tiles may be used to locate one or more game objects inside the virtual world. For example, if the tiles are squares, each tile may have a row number and a column number.

Figure 4:
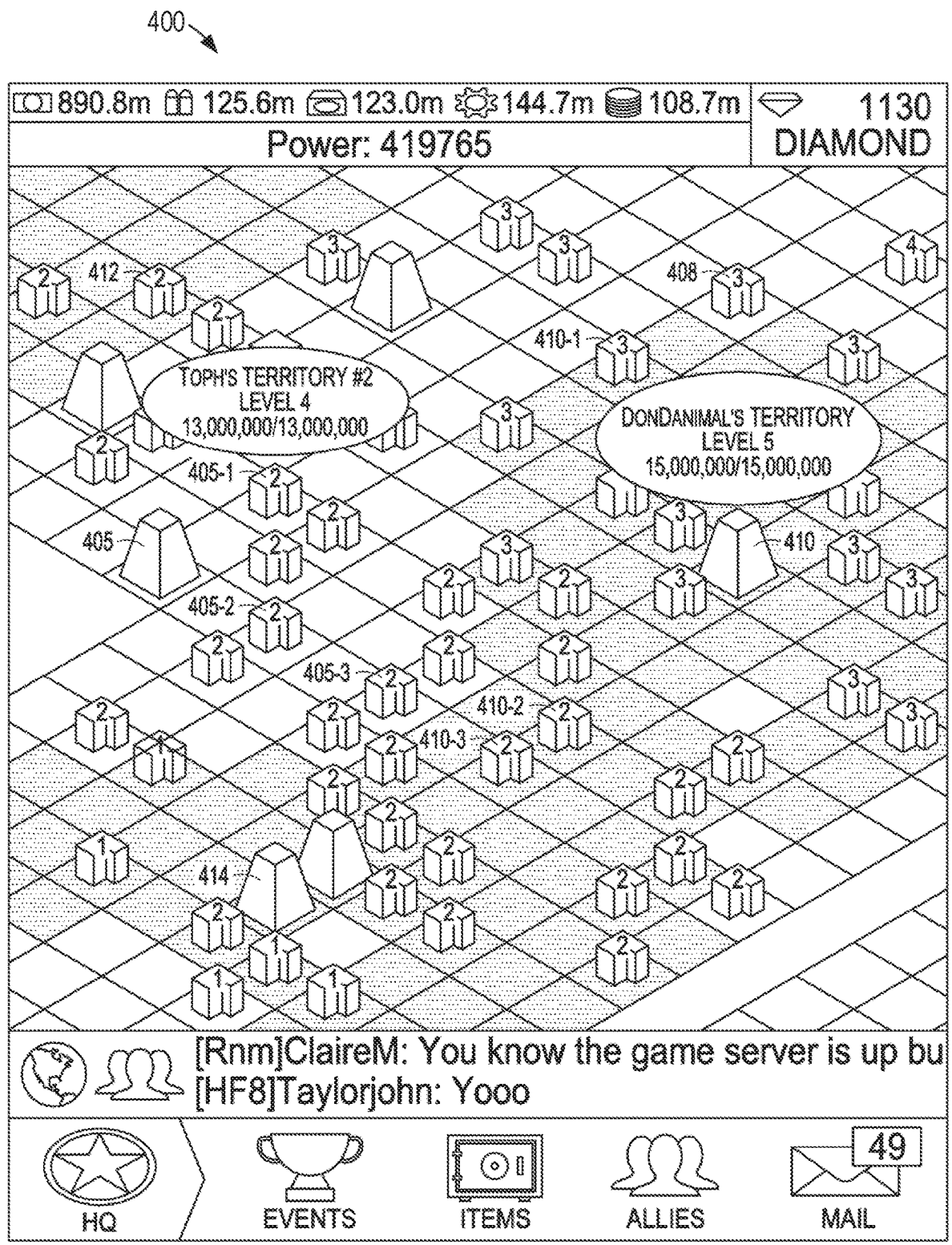
FIG. 4 is a block diagram illustrating user interface according to some example embodiments.

FIG. 4 is a block diagram illustrating user interface 400 according to some example embodiments.

The user interface 400 provides a view a portion of a virtual online game environment in which multiple player alliances are represented. A first player's enforcer asset 405 has territorial control of a plurality of adjacent tiles and tiles that have contact between their respective corners. Display of the first player's enforcer asset 405 includes a label of "Toph's Territory #2" and a current indication of enforcer level of "Level 4" and a health level of "13,000,000/13,000,000". In some embodiments, an enforcer level represents a one of a plurality of enforcer levels that define different features, assets and capabilities on an enforcer asset.

Tiles under territorial control of the first player's enforcer asset 405 are represented in a first color so as to denote association with a first player alliance of which the first player is a member. A first resource node 405-1 of resource type 2 is displayed as being placed on a tile under the territorial control of the first player's enforcer asset 405. A second resource node 405-2 of resource type 2 is also displayed as being placed on a tile under the territorial control of the first player's enforcer asset 405. A third resource node 405-3 of resource type 2 is also displayed as being placed on a tile under the territorial control of the first player's enforcer asset 405. The third resource node 405-3 shares a border with an adjacent tile that is currently under territorial control of a second player's enforcer asset 410, where the second player belongs to a second player alliance that is different than the first player alliance. The tile upon which the third resource node 405-3 situated is displayed according to a first color associated with the first player alliance. A different tile color is associated with the second player alliance. In addition, a fourth resource node 408 of resource type 3 is under control of an enforcer asset of another player in the first player alliance. The tiles upon which the resource nodes 405-1, 405-2, 405-3 and 408 are situated share the same alliance tile color.

The second player's enforcer asset 410 also has territorial control of other adjacent tiles and other tiles that have contact between their respective corners. Display of the second player's enforcer asset 410 includes a label of "DonDanimal Territory", a current indication of enforcer level of "Level 5" and a health level of "15,000,000/15,000,000". Such tiles under the territorial control of the second player's enforcer asset 410 are represented in a second color so as to denote association with the second player alliance of which the second player is a member. A fifth resource node 410-1 of resource type 3 is displayed on a tile under the territorial control of the second player's enforcer asset 410. A sixth resource node 410-2 of resource type 2 is also displayed as being placed on a tile under the territorial control of the second player's enforcer asset 410.

The second player and a third player are both in the second player alliance. A seventh resource node 410-3 of resource type 2 is displayed as being under the territorial control of the third player's enforcer asset 414. The tiles of the sixth and seventh resource nodes 410-2 410-3 share the same alliance tile color and are adjacent to each other. Such adjacency and common player alliance membership is detected by the Alliance Engine 305. Based at least on the detected adjacency of tiles of the sixth and seventh resource nodes 410-2 410-3, the Alliance Engine 305 allows transfer of in-game assets, in-game points, in-game health and resources between the second and third players. In addition, an eighth resource node 412 of resource type 2 is under control of an enforcer asset of another player in the second player alliance. The tiles upon which the resource nodes 410-1, 410-2, 410-3 and 412 are situated share the same alliance tile color.

Figure 5:
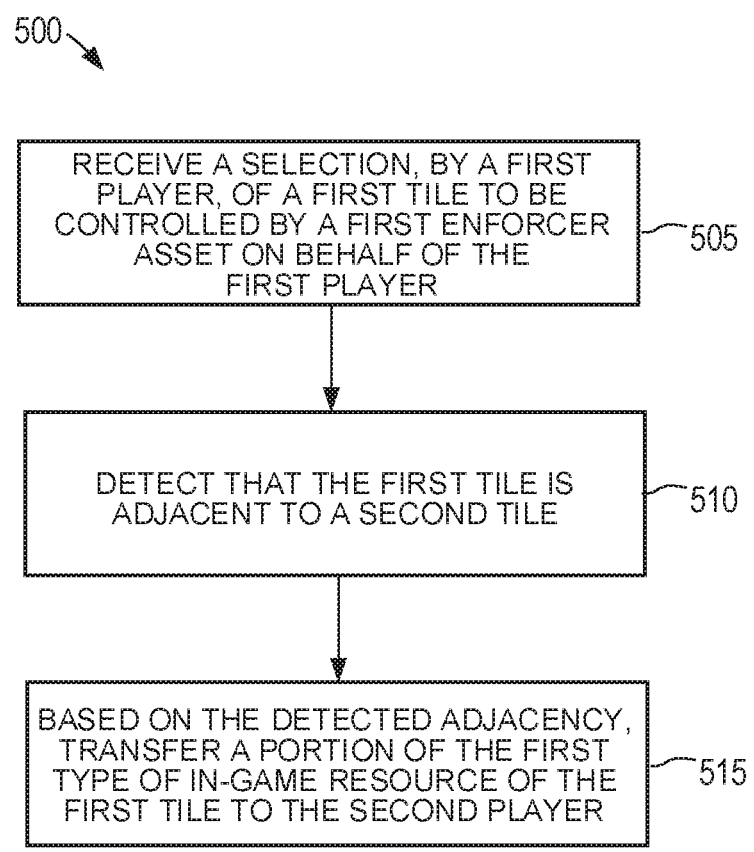
FIG. 5 is a flowchart illustrating an example method for adapting resource properties, according to an example embodiment.

FIG. 5 is a flowchart 500 illustrating an example method for adapting resource properties, according to an example embodiment.

At operation 505, the Alliance Engine 305 receives a selection, by a first player, of a first tile to be controlled by a first enforcer asset on behalf of the first player. The first tile provides access to a first type of in-game resource to the first player. Prior to operation 505, the Alliance Engine 305 grants the first enforcer asset to the first player and a second enforcer asset to a second player based on the first and second players joining a player alliance.

At operation 510, the Alliance Engine 305 detects that the first tile is adjacent to a second tile. The second tile is controlled by a second enforcer asset on behalf of a second player. The first player and the second player belong to a player alliance. The second tile providing access to a second type of in-game resource to the second player. In one embodiment, the Alliance Engine 305 updates an adaptive visual display property for both the first tile and the second tile based at least on the detected adjacency. For example, the Alliance Engine 305 concurrently adjusts at least one of: a shape, color, size, and intensity of both respective adjacent tiles.

At operation 515, based on the detected adjacency, the Alliance Engine 305 transfers a portion of the first type of in-game resource of the first tile to the second player. The Alliance Engine 305 transfers a portion of the second type of in-game resource of the second tile to the first player. It is understood, that in some embodiments, the first and the second tiles are included in a plurality of tiles in a territory grid of an online game. The first player has territorial control of a first headquarters tile of the territory grid and the second player has territorial control of a second headquarters tile of the territory grid.

Data Flow

Figure 6:
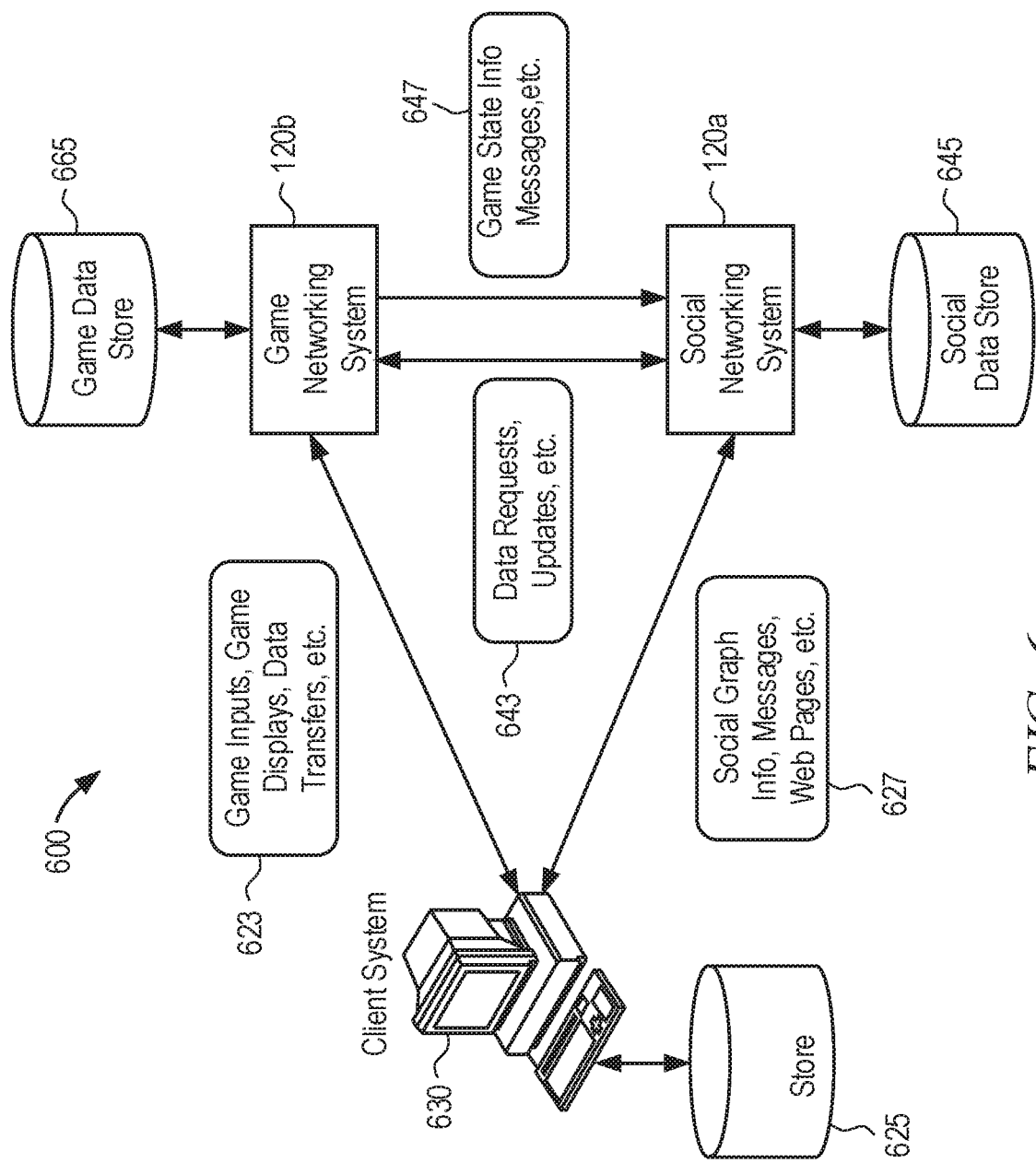
FIG. 6 is a diagrammatic representation of an example data flow between example components of the example system of FIG. 1, according to some example embodiments.

FIG. 6 illustrates an example data flow between the components of system 600. In particular embodiments, system 600 can include client system 630, social networking system 120*a* (i.e. social network system), and game networking system 120*b* (i.e. online game system system). The components of system 600 can be connected to each other in any suitable configuration, using any suitable type of connection. The components may be connected directly or over any suitable network. Client system 630, social networking system 120*a*, and game networking system 120*bb* can each have one or more corresponding data stores such as local data store 635, social data store 645, and game data store 665, respectively. Social networking system 120*a* and game networking system 120*b* can also have one or more servers that can communicate with client system 630 over an appropriate network. Social networking system 120*a* and game networking system 120*b* can have, for example, one or more internet servers for communicating with client system 530 via the Internet. Similarly, social networking system 120*a* and game networking system 120*b* can have one or more mobile servers for communicating with client system 630 via a mobile network (e.g., GSM, PCS, Wi-Fi, WPAN, etc.). In some embodiments, one server may be able to communicate with client system 530 over both the Internet and a mobile network. In other embodiments, separate servers can be used.

Client system 630 can receive and transmit data 623 to and from game networking system 120*b*. This data can include, for example, webpages, messages, game inputs, game displays, HTTP packets, data requests, transaction information, updates, and other suitable data. At some other time, or at the same time, game networking system 120*b* can communicate data 643, 647 (e.g., game state information, game system account information, page info, messages, data requests, updates, etc.) with other networking systems, such as social networking system 120*a* (e.g., Facebook, Myspace, etc.). Client system 630 can also receive and transmit data 627 to and from social networking system 120*a*. This data can include, for example, webpages, messages, social graph information, social network displays, HTTP packets, data requests, transaction information, updates, and other suitable data.

Communication between client system 630, social networking system 120*a*, and game networking system 120*b* can occur over any appropriate electronic communication medium or network using any suitable communications protocols. For example, client system 630, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTPS, FTP, SNMP, TELNET, and a number of other protocols, may be used. In some embodiments, no protocol may be used and, instead, transfer of raw data may be utilized via TCP or User Datagram Protocol. In addition, a server in one interaction context may be a client in another interaction context. In particular embodiments, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 120b, the BLOB containing the game state for the instance corresponding to the player can be transmitted to client system 630 for use by a client-side executed object to process. In particular embodiments, the client-side executable may be a FLASH-based game, which can de-serialize the game state data in the BLOB. As a player plays the game, the game logic implemented at client system 630 maintains and modifies the various game state parameters locally. The client-side game logic may also batch game events, such as mouse clicks, and transmit these events to game networking system 120b. Game networking system 120b may itself operate by retrieving a copy of the BLOB from a database or an intermediate memory cache (memcache) layer. Game networking system 120b can also de-serialize the BLOB to resolve the game state parameters and execute its own game logic based on the events in the batch file of events transmitted by the client to synchronize the game state on the server side. Game networking system 120b may then re-serialize the game state, now modified, into a BLOB and pass this to a memory cache layer for lazy updates to a persistent database.

With a client-server environment in which the online games may run, one server system, such as game networking system 120b, may support multiple client systems 630. At any given time, there may be multiple players at multiple client systems 630 all playing the same online game. In practice, the number of players playing the same game at the same time may be very large. As the game progresses with each player, multiple players may provide different inputs to the online game at their respective client systems 630, and multiple client systems 630 may transmit multiple player inputs and/or game events to game networking system 120b for further processing. In addition, multiple client systems 630 may transmit other types of application data to game networking system 120b.

In particular embodiments, a computed-implemented game may be a text-based or turn-based game implemented as a series of web pages that are generated after a player selects one or more actions to perform. The web pages may be displayed in a browser client executed on client system 630. As an example and not by way of limitation, a client application downloaded to client system 630 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 120a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 630, either caused by an action of a game player or by the game logic itself, client system 630 may need to inform game networking system 120b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 600 is discussed in reference to updating a multi-player online game hosted on a network-addressable system (such as, for example, social networking system 120a or game networking system 120b), where an instance of the online game is executed remotely on a client system 630, which then transmits application event data to the hosting system such that the remote game server synchronizes game state associated with the instance executed by the client system 630.

In particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 630 may include a Flash client. The Flash client may be configured to receive and run Flash application or game object code from any suitable networking system (such as, for example, social networking system 120a or game networking system 120b). In particular embodiments, the Flash client may be run in a browser client executed on client system 630. A player can interact with Flash objects using client system 630 and the Flash client. The Flash objects can represent a variety of in-game objects. Thus, the player may perform various in-game actions on various in-game objects by make various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 630, the Flash client may send the events that caused the game state changes to the in-game object to game networking system 120b. However, to expedite the processing and hence the speed of the overall gaming experience, the Flash client may collect a batch of some number of events or updates into a batch file. The number of events or updates may be determined by the Flash client dynamically or determined by game networking system 120*b* based on server loads or other factors. For example, client system 630 may send a batch file to game networking system 120*b* whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 630. In particular embodiments, the batch file may be a text file and the name-value pairs may be in string format.

In particular embodiments, when a player plays an online game on client system 630, game networking system 120*b* may serialize all the game-related data, including, for example and without limitation, game states, game events, user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 120*b* may retrieve the corresponding BLOB from the database to determine the most-recent values of the game-related data. In particular embodiments, while a player is playing the online game, game networking system 120*b* may also load the corresponding BLOB into a memory cache so that the game system may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Figure 7:
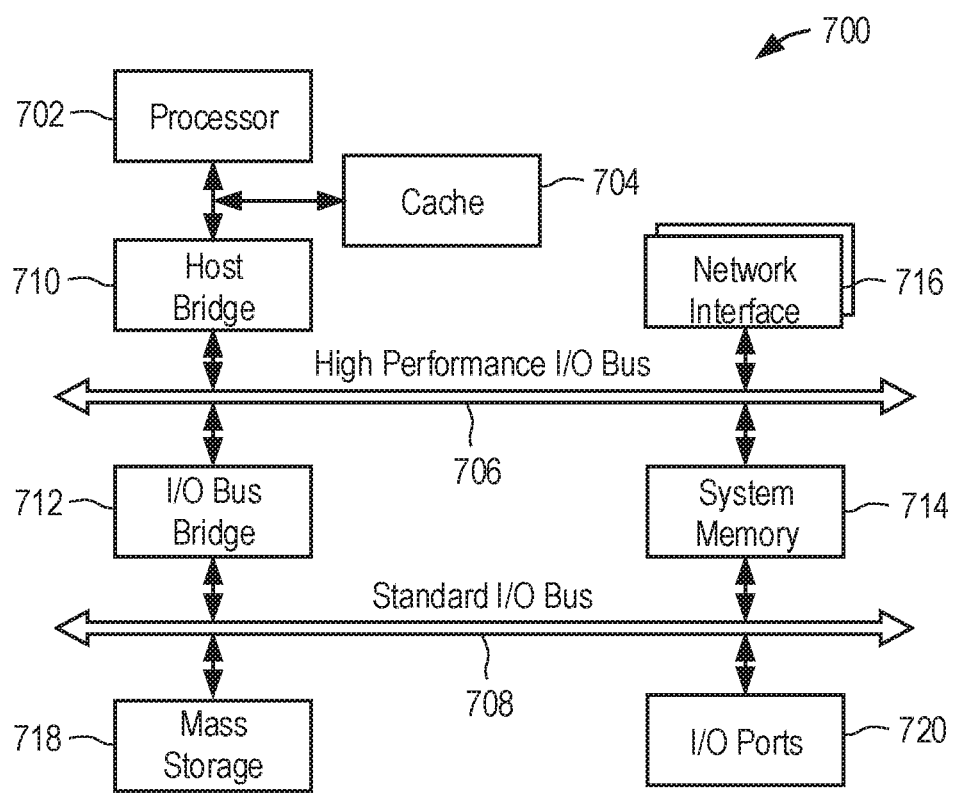
FIG. 7 illustrates an example computing system architecture, which may be used to implement a server or a client system illustrated in FIG. 8, according to some example embodiments.
Figure 8:
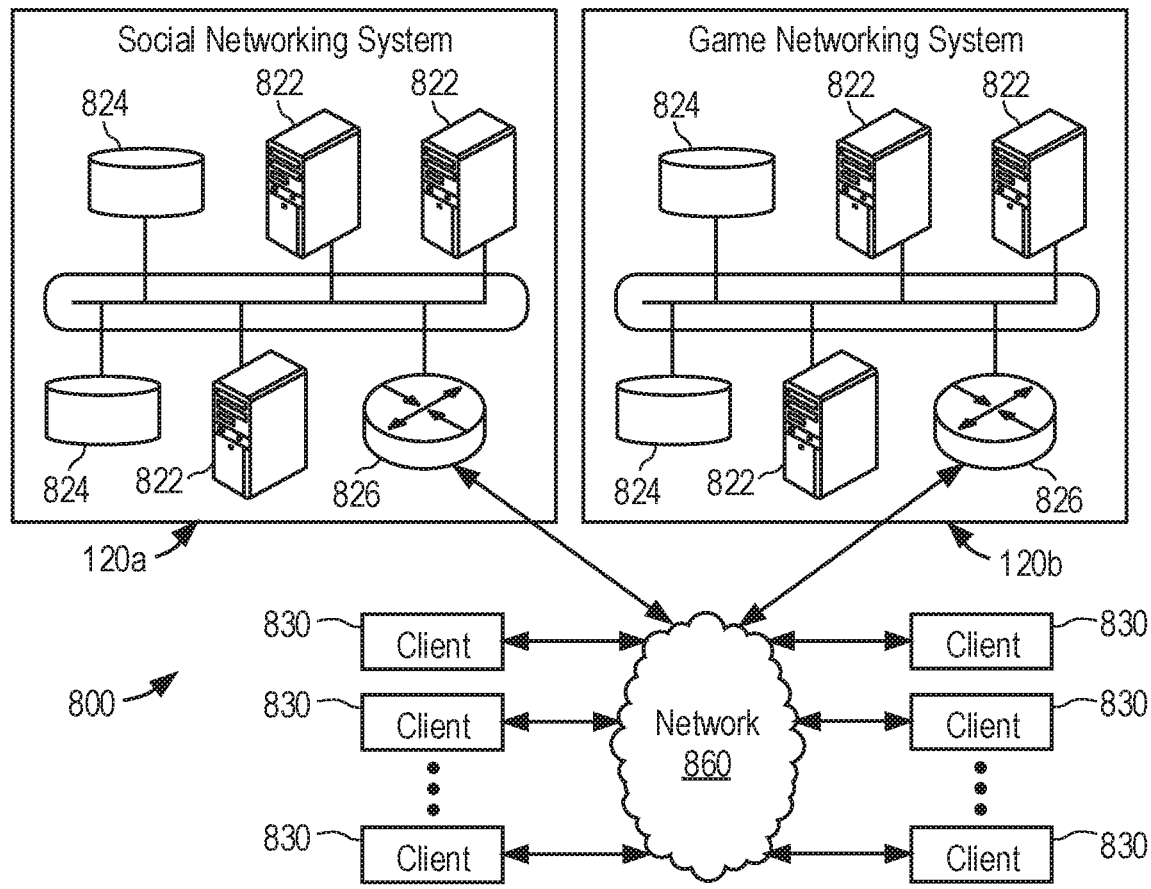
FIG. 8 illustrates an example network environment, in which various example embodiments may operate.

FIG. 7 illustrates an example computing system architecture, which may be used to implement a server 822 or a client system 830 illustrated in FIG. 8. In one embodiment, hardware system 700 comprises a processor 702, a cache memory 704, and one or more executable modules and drivers, stored on a tangible computer readable medium, directed to the functions described herein. Additionally, hardware system 700 may include a high performance input/output (I/O) bus 706 and a standard I/O bus 708. A host bridge 710 may couple processor 702 to high performance I/O bus 706, whereas I/O bus bridge 712 couples the two buses 706 and 708 to each other. A system memory 714 and one or more network/communication interfaces 716 may couple to bus 706. Hardware system 700 may further include video memory (not shown) and a display device coupled to the video memory. Mass storage 718 and I/O ports 720 may couple to bus 708. Hardware system 700 may optionally include a keyboard, a pointing device, and a display device (not shown) coupled to bus 708. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 700 are described in greater detail below. In particular, network interface 716 provides communication between hardware system 600 and any of a wide range of networks, such as an Ethernet (e.g., IEEE 802.3) network, a backplane, etc. Mass storage 718 provides permanent storage for the data and programming instructions to perform the above-described functions implemented in servers 822, whereas system memory 714 (e.g., DRAM) provides temporary storage for the data and programming instructions when executed by processor 702. I/O ports 720 are one or more serial and/or parallel communication ports that provide communication between additional peripheral devices, which may be coupled to hardware system 700.

Hardware system 700 may include a variety of system architectures and various components of hardware system 700 may be rearranged. For example, cache 704 may be on-chip with processor 702. Alternatively, cache 704 and processor 702 may be packed together as a "processor module," with processor 702 being referred to as the "processor core." Furthermore, certain embodiments of the present disclosure may not require nor include all of the above components. For example, the peripheral devices shown coupled to standard I/O bus 708 may couple to high performance I/O bus 706. In addition, in some embodiments, only a single bus may exist, with the components of hardware system 700 being coupled to the single bus. Furthermore, hardware system 700 may include additional components, such as additional processors, storage devices, or memories.

An operating system manages and controls the operation of hardware system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit. Particular embodiments may operate in a wide area network environment, such as the Internet, including multiple network addressable systems.

FIG. 8 illustrates an example network environment, in which various example embodiments may operate. Network cloud 860 generally represents one or more interconnected networks, over which the systems and hosts described herein can communicate. Network cloud 860 may include packetbased wide area networks (such as the Internet), private networks, wireless networks, satellite networks, cellular networks, paging networks, and the like. As FIG. 8 illustrates, particular embodiments may operate in a network environment comprising one or more networking systems, such as social networking system 120a, game networking system 120b, and one or more client systems 830. The components of social networking system 120a and game networking system 120b operate analogously; as such, hereinafter they may be referred to simply at networking system 820. Client systems 830 are operably connected to the network environment via a network service provider, a wireless carrier, or any other suitable means.

Networking system 120 is a network addressable system that, in various example embodiments, comprises one or more physical servers 822 and data stores 824. The one or more physical servers 822 are operably connected to computer network 860 via, by way of example, a set of routers and/or networking switches 826. In an example embodiment, the functionality hosted by the one or more physical servers 822 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 822 may host functionality directed to the operations of networking system 820. Hereinafter servers 822 may be referred to as server 822, although server 822 may include numerous servers hosting, for example, networking system 820, as well as other content distribution servers, data stores, databases and cloud computing systems. Data store 824 may store content and data relating to, and enabling, operation of networking system 820 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 824 corresponds to one or more of a variety of separate and integrated databases, such as relational databases and object-oriented databases, that maintain information as an integrated collection of logically related records or files stored on one or more physical systems. Structurally, data store 824 may generally include one or more of a large class of data storage and management systems. In particular embodiments, data store 824 may be implemented by any suitable physical system(s) including components, such as one or more database servers, mass storage media, media library systems, storage area networks, data storage clouds, and the like. In one example embodiment, data store 824 includes one or more servers, databases (e.g., MySQL), and/or data warehouses. Data store 824 may include data associated with different networking system 820 users and/ or client systems 830.

Client system 830 is generally a computer or computing device including functionality for communicating (e.g., remotely) over a computer network. Client system 830 may be a desktop computer, laptop computer, personal digital assistant (PDA), in- or out-of-car navigation system, smart phone or other cellular or mobile phone, or mobile gaming device, among other suitable computing devices. Client system 830 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 830 to enter addresses of specific network resources to be retrieved, such as resources hosted by networking system 820. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 830 desires to view a particular webpage (hereinafter also referred to as target structured document) hosted by networking system 820, the user's web browser, or other document Sequence Generator or suitable client application, formulates and transmits a request to networking system 820. The request generally includes a URL or other document identifier as well as metadata or other information. By way of example, the request may include information identifying the user, such as a user ID, as well as information identifying or characterizing the web browser or operating system running on the user's client computing device 830. The request may also include location information identifying a geographic location of the user's client system or a logical network location of the user's client system. The request may also include a timestamp identifying when the request was transmitted.

Although the example network environment described above and illustrated in FIG. 8 described with respect to social networking system 120a and game networking system 120b, this disclosure encompasses any suitable network environment using any suitable systems. As an example and not by way of limitation, the network environment may include online media systems, online reviewing systems, online search engines, online advertising systems, or any combination of two or more such systems.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A computer system, comprising:
    a processor; and
    a memory device holding an instruction set executable on the processor to cause the computer systems to perform operations comprising:
        generating a game instance for a multiplayer online game, the game instance providing a game area divided into multiple tiles, respective user-controlled assets being selectively placeable on user-selected tiles;
        receiving a selection, by a first player, of a first tile to be controlled by a first enforcer asset on behalf of the first player, the first tile providing access to a first type of in-game resource to the first player;
        detecting that the first tile is adjacent to a second tile, the second tile being controlled by a second enforcer asset on behalf of a second player, the first player and the second player belonging in common to a player alliance, the second tile providing access to a second type of in-game resource to the second player; and
        based on the detected adjacency and based on the first player and the second player belonging to the player alliance, automatically changing an adaptive visual display property for both the first tile and the second tile.

2. The computer system as in claim 1, wherein changing an adaptive visual display property of a pair of respective adjacent tiles comprises:
    concurrently adjusting at least one of: a shape, color, size, and intensity of both respective adjacent tiles.

3. The computer system as in claim 1, further comprising:
    prior to receiving a selection, by the first player, of the first tile to be controlled by the first enforcer asset:
        granting the first enforcer asset to the first player and the second enforcer asset to the second player based on the first and second players joining the player alliance.

4. The computer system as in claim 1, further comprising:
    updating an adaptive resource property of the first tile based in part on a current strength level of the first enforcer asset, wherein the updated adaptive resource property increases an amount of the first type of in-game resource available to the first player from the first tile.

5. The computer system as in claim 1, further comprising:
    wherein the first and the second tiles are included in a plurality of tiles in a territory grid of an online game.

6. The computer system as in claim 1, further comprising:
    wherein the first player has territorial control of a first headquarters tile of the territory grid; and
    wherein the second player has territorial control of a second headquarters tile of the territory grid.

7. A computer-implemented method, comprising:
    in an automated operation performed by one or more computer processor devices configured therefor, generating a game instance for a multiplayer online game, the game instance providing a game area divided into multiple tiles, respective user-controlled assets being selectively placeable on user-selected tiles;
    receiving a selection, by a first player, of a first tile to be controlled by a first enforcer asset on behalf of the first player, the first tile providing access to a first type of in-game resource to the first player;
    detecting that the first tile is adjacent to a second tile, the second tile being controlled by a second enforcer asset on behalf of a second player, the first player and the second player belonging in common to a player alliance, the second tile providing access to a second type of in-game resource to the second player; and
    based on the detected adjacency and based on the first player and the second player belonging to the player alliance, automatically changing an adaptive visual display property for both the first tile and the second tile.

8. The computer-implemented method as in claim 7, wherein changing an adaptive visual display property of a pair of respective adjacent tiles comprises:
concurrently adjusting at least one of: a shape, color, size, and intensity of both respective adjacent tiles.

9. The computer-implemented method as in claim 7, further comprising:
prior to receiving a selection, by the first player, of the first tile to be controlled by the first enforcer asset:
granting the first enforcer asset to the first player and the second enforcer asset to the second player based on the first and second players joining the player alliance.

10. The computer-implemented method as in claim 7, further comprising:
updating an adaptive resource property of the first tile based in part on a current strength level of the first enforcer asset, wherein the updated adaptive resource property increases an amount of the first type of in-game resource available to the first player from the first tile.

11. The computer-implemented method as in claim 7, further comprising:
wherein the first and the second tiles are included in a plurality of tiles in a territory grid of an online game.

12. The computer-implemented method as in claim 7, further comprising:
wherein the first player has territorial control of a first headquarters tile of the territory grid; and
wherein the second player has territorial control of a second headquarters tile of the territory grid.

13. A non-transitory computer-readable medium storing executable instructions thereon, which, when executed by a processor, cause the processor to perform operations including:
generating a game instance for a multiplayer online game, the game instance providing a game area divided into multiple tiles, respective user-controlled assets being selectively placeable on user-selected tiles;
receiving a selection, by a first player, of a first tile to be controlled by a first enforcer asset on behalf of the first player, the first tile providing access to a first type of in-game resource to the first player;
detecting that the first tile is adjacent to a second tile, the second tile being controlled by a second enforcer asset on behalf of a second player, the first player and the second player belonging in common to a player alliance, the second tile providing access to a second type of in-game resource to the second player; and
based on the detected adjacency and based on the first player and the second player belonging to the player alliance, automatically changing an adaptive visual display property for both the first tile and the second tile.

14. The computer-readable medium as in claim 13, further comprising:
prior to receiving a selection, by the first player, of the first tile to be controlled by the first enforcer asset:
granting the first enforcer asset to the first player and the second enforcer asset to the second player based on the first and second players joining the player alliance.

15. The computer-readable medium as in claim 13, further comprising:
updating an adaptive resource property of the first tile based in part on a current strength level of the first enforcer asset, wherein the updated adaptive resource property increases an amount of the first type of in-game resource available to the first player from the first tile.

16. The computer-readable medium as in claim 13, further comprising:
wherein the first and the second tiles are included in a plurality of tiles in a territory grid of an online game.

17. The computer-readable medium as in claim 16, further comprising:
wherein the first player has territorial control of a first headquarters tile of the territory grid; and
wherein the second player has territorial control of a second headquarters tile of the territory grid.

* * * * *

UNITED STATES PATENT AND TRADEMARK OFFICE
CERTIFICATE OF CORRECTION

PATENT NO. : 10,709,986 B2  
APPLICATION NO. : 16/213681  
DATED : July 14, 2020  
INVENTOR(S) : Massimo Maietti Page 1 of 1

It is certified that error appears in the above-identified patent and that said Letters Patent is hereby corrected as shown below:

In the Specification

In Column 18, Line 7, delete "120bb" and insert --120b-- therefor

In Column 18, Line 9, delete "635," and insert --625,-- therefor

In Column 18, Line 16, delete "530" and insert --630-- therefor

In Column 18, Line 21, delete "530" and insert --630-- therefor

Signed and Sealed this  
Nineteenth Day of January, 2021

Andrei Iancu  
*Director of the United States Patent and Trademark Office*